United States Patent
Gaben et al.

(10) Patent No.: US 11,228,056 B2
(45) Date of Patent: Jan. 18, 2022

(54) PROCESS FOR MAKING SOLID ELECTROLYTE THIN FILMS FOR LITHIUM ION BATTERIES

(71) Applicant: I-TEN, Champagne-Au-Mont-d'Or (FR)

(72) Inventors: Fabien Gaben, Ecully (FR); Frédéric Bouyer, Perrigny les Dijon (FR); Bruno Vuillemin, Darbonnay (FR)

(73) Assignee: I-TEN, Champagne-au-Mont-d'Or (FR)

( * ) Notice: Subject to any disclaimer, the term of this patent is extended or adjusted under 35 U.S.C. 154(b) by 0 days.

(21) Appl. No.: 16/273,348

(22) Filed: Feb. 12, 2019

(65) Prior Publication Data
US 2019/0173129 A1    Jun. 6, 2019

Related U.S. Application Data

(62) Division of application No. 14/355,179, filed as application No. PCT/FR2012/052497 on Oct. 30, 2012, now Pat. No. 10,340,548.

(30) Foreign Application Priority Data

Nov. 2, 2011  (FR) ..................................... 1159893

(51) Int. Cl.
*H01M 10/0562* (2010.01)
*H01M 10/0564* (2010.01)
*H01M 10/058* (2010.01)
*H01M 10/052* (2010.01)
*H01M 4/04* (2006.01)

(52) U.S. Cl.
CPC ..... *H01M 10/0562* (2013.01); *H01M 10/052* (2013.01); *H01M 10/058* (2013.01); *H01M 10/0564* (2013.01); *H01M 4/0402* (2013.01); *H01M 4/043* (2013.01); *H01M 2300/0068* (2013.01); *H01M 2300/0082* (2013.01); *Y02T 10/70* (2013.01)

(58) Field of Classification Search
None
See application file for complete search history.

(56) References Cited

U.S. PATENT DOCUMENTS

| | | | |
|---|---|---|---|
| 3,959,022 A | 5/1976 | Dejonghe | |
| 6,159,637 A | 12/2000 | Shizuka | |

(Continued)

FOREIGN PATENT DOCUMENTS

| | | |
|---|---|---|
| EP | 0453796 A2 | 10/1991 |
| JP | 2002042792 A | 2/2002 |

OTHER PUBLICATIONS

Machine translation of JP 2002-042792 A (Year: 2002).*

(Continued)

*Primary Examiner* — Robert S Carrico
(74) *Attorney, Agent, or Firm* — Jordan IP Law, LLC; Todd A. Vaughn

(57) ABSTRACT

A process for fabrication of a battery that includes providing a colloidal suspension of particles conducting lithium ions and providing two conducting substrates as battery current collectors, at least one surface of the conducting substrates being at least partially coated with one of a cathode film and an anode film, and depositing an electrolyte film by electrophoresis, from a suspension of electrolyte material particles, on at least one of said anode film, said cathode film and said conducting substrates.

18 Claims, 9 Drawing Sheets

(56) References Cited

U.S. PATENT DOCUMENTS

| | | | |
|---|---|---|---|
| 9,249,522 B2* | 2/2016 | Golodnitsky | H01M 2/0202 |
| 2002/0172871 A1 | 11/2002 | Shucker | |
| 2003/0134176 A1 | 7/2003 | Sarkar | |
| 2004/0185336 A1 | 9/2004 | Ito | |
| 2004/0222098 A1 | 11/2004 | Clasen | |
| 2005/0132562 A1 | 6/2005 | Saito | |
| 2007/0087269 A1* | 4/2007 | Inda | H01M 10/0562 |
| | | | 429/322 |
| 2008/0220334 A1* | 9/2008 | Inda | H01M 6/185 |
| | | | 429/322 |
| 2009/0197178 A1* | 8/2009 | Inda | H01M 10/0525 |
| | | | 429/231.95 |

OTHER PUBLICATIONS

Lee et al., "Electrical Conductivity in Li—Si—P—O—N Oxynitride Thin-Films", Journal of Power Sources, vol. 123, No. 1, 2003, pp. 61-64.

* cited by examiner

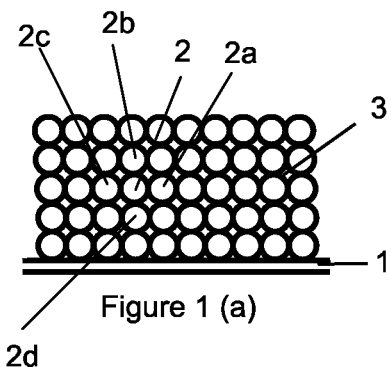
Figure 1 (a)
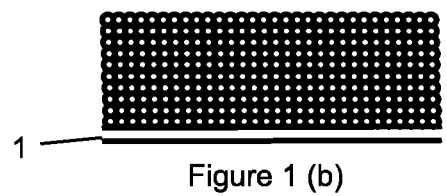
Figure 1 (b)
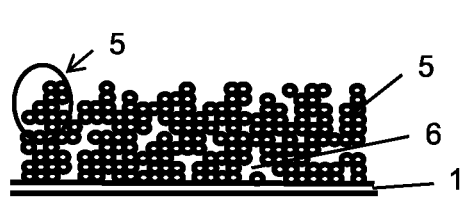
Figure 1 (c)
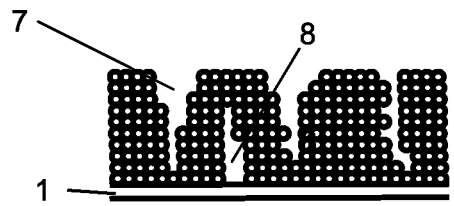
Figure 1 (d)
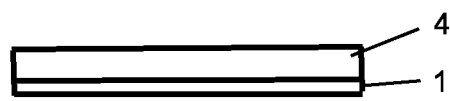
Figure 1 (e)
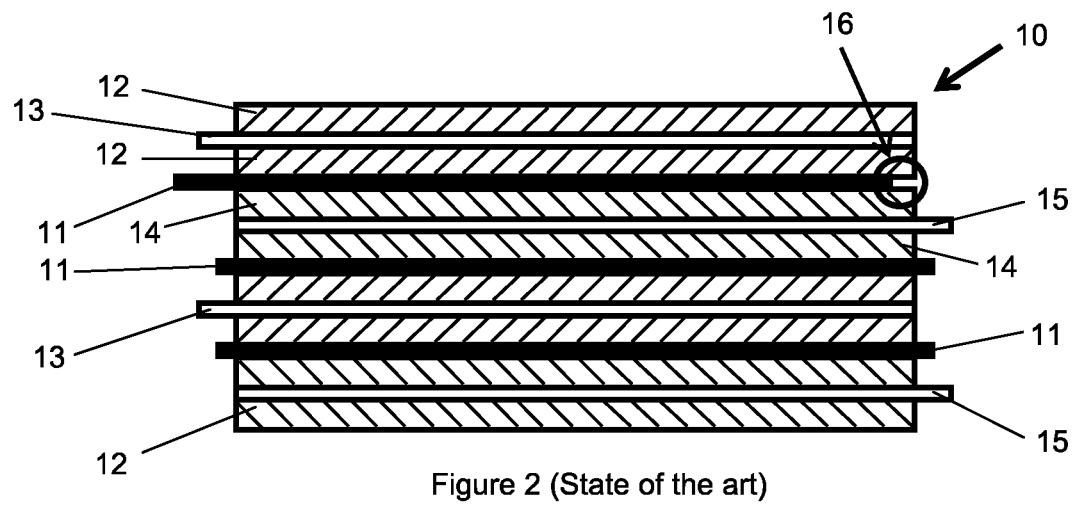
Figure 2 (State of the art)

PROCESS FOR MAKING SOLID ELECTROLYTE THIN FILMS FOR LITHIUM ION BATTERIES

CROSS-REFERENCE TO RELATED APPLICATIONS

The present application is a divisional of U.S. patent application Ser. No. 14/355,179 (filed Apr. 29, 2014), which is a National Stage Application of PCT International Application No. PCT/FR2012/052497 (filed on Oct. 30, 2012), under 35 U.S.C. § 371, which claims priority to French Patent Application No. FR 1159893 (filed on Nov. 2, 2011), which are each hereby incorporated by reference in their respective entireties.

FIELD OF THE INVENTION

This invention relates to the field of batteries and particularly lithium ion batteries. It most particularly concerns all-solid-state lithium ions batteries and more particularly a new method for making solid electrolyte thin films for such batteries.

STATE OF THE ART

The ideal battery for supplying power to standalone electrical devices (such as telephones and laptop computers, portable tools, standalone sensors) or for traction of electrical vehicles would have a long life, would be capable of storing large quantities of energy and power, and would not exhibit any risk of overheating or explosion.

At the present time, these electrical devices are powered essentially by lithium ion batteries (herein called "Li-ion" batteries) that have the best energy density among the various proposed storage technologies. However, Li-ion batteries can be made using different architectures and with different chemical compositions of their electrodes.

Methods of making Li-ion batteries are presented in many articles and patents and the "Advances in Lithium-Ion Batteries" book (published by W. van Schalkwijk and B. Scrosati) in 2002 (Kluever Academic/Plenum Publishers) gives a good inventory of these processes.

Li-ion battery electrodes can be made using coating techniques (for example using techniques such as roll coating, doctor blade, tape casting). These can be used to make deposits between 50 and 400 μm thick. The power and energy of the battery can be modulated by varying the thickness of the deposit, its porosity and the size of its active particles. Inks (or pastes) deposited on electrodes contain particles of active materials and also binders (organic), carbon powder to make the electrical contact between particles, and solvents that are evaporated during the electrode drying step.

A calendering step is performed on the electrodes to improve the quality of electrical contacts between particles and to compact the deposits. After this compression step, active particles of the electrodes occupy about 60% of the volume, which means that there is usually 40% porosity between particles filled with an electrolyte. This electrolyte transports lithium ions between particles (diffusion of lithium within the electrode thickness). It may indifferently be liquid (aprotic solvent in which a lithium salt is dissolved) or in the form of a polymer impregnated with a lithium salt. Binders used in the formulation of inks also contribute to the transport of lithium ions.

These batteries also comprise a separator placed between the anode and the cathode. It is an approximately 20 μm thick porous polymer film. The electrolyte will be added during the final assembly of the battery when the anode and the cathode are stacked or rolled with the separator between them. The electrolyte migrates into the pores contained in the separator and also in the electrodes and thus provides ionic conduction between the electrodes.

The power and energy of a battery may be varied by varying the thickness of the deposits and the size and density of active particles contained in the ink. With such architectures, the increase in the energy density is necessarily at the detriment of the power density. High power battery cells require thin electrodes with small diameter particles, while the increase in the energy density requires that this thickness should be increased.

Furthermore, when an attempt is made to make high power batteries, the porosity of the separator film should be increased in order to reduce the resistance to transport of lithium ions between the two electrodes. However, this increase in porosity tends to increase risks of short circuit internal to the battery cell, since metallic lithium can precipitate in the pores. Similarly, if electrode particles are too small, they can detach from the electrode and migrate into these pores.

Electrolytes based on organic solvents and lithium salts tend to oxidize more quickly under the effect of high electrical potentials and/or high temperatures and excessive traces of humidity. This degradation can be slow and continuous when the battery cell is exposed to a temperate external environment (aging) but it can also become fast and sudden in the case of overheating or overload. Evaporation and combustion of this electrolyte can then initiate a violent reaction that can cause the cell to explode.

Dense polymer films conducting lithium ions may be used as separators to reduce these risks. These films are also more resistive and they must be thin to not degrade performances of the battery excessively because their ionic conductivity is low. It is very difficult to obtain films thinner than 30 μm to 40 μm using current polymer film fabrication techniques due to the poor mechanical properties of polymer films. For example, such films are disclosed in patent application WO 2004/051769 (Avestor Ltd Partnership).

Ceramic particles that might conduct lithium ions have been added as disclosed in patent application EP 1 049 188 A1 (Ohara KK) to improve the mechanical properties of polymer films. However, film thicknesses obtained are still close to 20 μm.

Patent EP 1 424 743 A1 (Ohara KK) discloses the deposition of an electrolyte film directly onto the surface of the electrodes in order to further reduce film thicknesses. One of the processes disclosed consists of coating the surface of an electrode with an ink containing a polymer electrolyte and particles of inorganic solid electrolyte conducting lithium ions. The thickness of the solid electrolyte film is about 3 μm. The average diameter of inorganic particles is 150 nm. The fabrication process also comprises an anode and cathode assembly, each coated with electrolyte, by pressing by passing between rolls.

Thus, the coating techniques described above can be used to make thin deposits. Micronic deposits can be deposited by printing a fluid ink. The fluidity of inks depends on the content of dry extracts, particle sizes and the nature of the solvent and any organic compounds dissolved in this ink. The viscosity of inks increases as the concentration of particles increases, or for a given dry extract, as the particle size reduces. When the particle size is reduced, electrostatic interactions between particle surfaces increase, which contributes to increasing the ink viscosity. Furthermore, the increase in the solvent quantity increases the risks of forming cracks, cavities and clusters in the deposit during the drying phases. The deposits then become very difficult to compact.

This drying step is difficult to control because the regions with the lowest densities, in other words with the fewest particles, will dry faster than zones with higher densities.

Capillary effects induced by these local differences in drying will cause zones with higher densities that are still impregnated to group together. After drying, this leads to the formation of cavities and clusters. The only way to eliminate these defects by compaction is to apply very high pressures, particularly as the particle size reduces.

Electrolyte and/or separator polymer films obtained using these techniques only cover electrode surfaces, while the electrode edges remain exposed. The dielectric insulation on the edges of the cells is not formed perfectly and depends on the mechanical stresses and the precision with which these films are placed. This can give rise to small leakage currents that can induce a self-discharge phenomenon or even a short circuit internal to the cell.

Furthermore, the use of organic electrolytes containing lithium salts limits the choice of electrode materials that can be used, because most of them react to the strongly reducing or oxidizing potentials of anodes and cathodes.

Another method of making an electrolyte thin film has been disclosed. It consists of vacuum deposition of a thin film of ceramic or vitro ceramic particles conducting lithium ions. Vacuum deposition can give solid and dense electrolyte films without pores, with excellent mechanical properties and preventing the occurrence of short circuits internal to the battery. These perfectly dense films with no pores also cover the entire electrode including its edges. Furthermore, the absence of pores in such all-inorganic films means that lithium ions can be transported through the film by diffusion, without the need to use liquid polymer-based or solvent-based electrolytes containing lithium salts.

Such all-inorganic films provide Li-ion batteries with excellent aging, safety and temperature resistance properties.

Thus, thin dense electrolyte films, either all-inorganic or not, have many advantages. However, vacuum deposition techniques are very expensive and difficult to implement industrially over a large area with a high productivity.

Finally, there is another alternative for deposition of materials in thin films in electrochemical devices and particularly in batteries. This is an electrophoretic particle deposition.

For example, patent application U.S. Pat. No. 7,662,265 (Massachusetts Institute of Technology) discloses the fabrication of thin film electrochemical devices (including batteries) by electrophoresis in which one of the electrodes (anode or cathode) and the solid electrolyte are obtained simultaneously, the other electrode having already been formed by electrophoretic deposition. The solid electrolyte obtained by this process is a polyethylene oxide doped with LiClO$_4$.

Patent application JP 2002-042792 (DENSO) discloses a process for depositing a solid electrolyte on an electrode of a battery, the deposit being made by electrophoresis. The target electrolytes are essentially polymer electrolytes such as polyethylene oxide, polyacrylonitrile, polyvinylidene fluoride and inorganic electrolytes such as lithium nitride, lithium iodide, lithium phosphates, zirconium and lithium phosphates, titanium and lithium phosphates. The size of the particles deposited by electrophoresis must preferably be less than 1 µm, and the thickness of the film formed is preferably less than 10 µm. No consolidation is done after the deposition, and a lithium salt (LiPF$_6$) is impregnated in the pores of the battery.

PURPOSES OF THE INVENTION

A first purpose of the invention is to make electrolyte thin films for Li-ion battery without defects or pores, and capable of covering three-dimensional surfaces and avoiding risks of internal short circuits, or self-discharge.

A second purpose of the invention is to make a film containing only ceramic or vitroceramic compounds conducting lithium ions, in order to increase the resistance of the battery to high temperatures, to limit reduction in life due to oxidation of electrolytes and risks of internal combustion in the battery, and this all-inorganic film also makes it possible to use higher energy materials, in other words materials capable of operating at relatively high potentials and consequently storing more energy (since energy is capacity× potential).

Another purpose of the invention is to fabricate electrolyte thin films for Li-ion batteries industrially at large scale over large areas and at lower cost.

Another purpose of the invention is to make thin films with high geometric precision, with a very small quantity of defects and with high deposition rates that can be used to make electrolyte films for batteries.

These purposes are achieved by the use of a process for the fabrication of a solid electrolyte thin film in an all-solid-state thin-film micro-battery comprising the following steps:
 a) Providing a possibly conducting substrate film, possibly coated with an anode or cathode film,
 b) Depositing an electrolyte thin film by electrophoresis, from a suspension of particles of electrolyte material, on said substrate and/or said previously formed anode or cathode film,
 c) Drying the film thus obtained,
 d) Consolidating the electrolyte thin film obtained previously, by mechanical compression and/or heat treatment.

Advantageously, the average size $D_{50}$ of particles of solid electrolyte material is less than 1 µm, preferably less than 100 nm and even more preferably less than or equal to 30 nm. This allows to reduce the consolidation temperature.

In one embodiment, the electrolyte particles are composed of at least one inorganic material. This can give solid dense electrolyte films without pores, with excellent mechanical properties, capable of transporting lithium ions by diffusion through the film.

Preferably, the materials are selected in the group formed by:
 (i) lithium compounds based on lithium and phosphorus oxinitride (called LiPON) in the form $Li_xPO_yN_z$ where x ~2.8 and 2y+3z ~7.8 and 0.16≤z≤0.4, and particularly $Li_{2.9}PO_{3.3}N_{0.46}$, but also all variants in the form $Li_w$-$PO_xN_yS_z$ where 2x+3y+2z=5=w and 3.2≤x≤3.8, 0.13≤y≤0.4, 0≤z≤0.2, 2.9≤w≤3.3 or in the form $Li_pP_x$-$Al_yO_uN_vS_w$ where 5x+3y=5, 2u+3v+2w=5+t, 2.9≤t≤3.3, 0.94≤x≤0.84, 0.094≤y≤0.26, 3.2≤u≤3.8, 0.13≤v≤0.46, 0≤w≤0.2;
 (ii) lithium compounds based on lithium, phosphorus and silicon oxinitride (called LiSiPON), and particularly $Li_{1.9}Si_{0.28}P_{1.0}O_{1.1}N_{1.0}$;

(iii) lithium oxinitrides of the LiBON, LiBSO, LiSiPON, LiSON, thio-LiSiCON, LiPONB types (where B, P and S represent boron, phosphorus and sulfur respectively);
(iv) $La_{0.51}Li_{0.34}Ti_{2.94}$, $Li_{3.4}V_{0.4}Ge_{0.6}O_4$, $Li_2O$—$Nb_2O_5$, $LiAlGaSPO_4$ compounds;
(v) formulations based on $Li_4SiO_4$, $Li_3PO_4$, $Li_2CO_3$, $B_2O_3$, $Li_2O$, $Al(PO_3)_3LiF$, $P_2S_3$, $Li_2S$, $Li_3N$, $Li_{14}Zn(GeO_4)_4$, $Li_{3.6}Ge_{0.6}V_{0.4}O_4$, $LiTi_2(PO_4)_3$, $Li_{0.35}La_{0.55}TiO_3$, $Li_{3.25}Ge_{0.25}P_{0.25}S_4$, $Li_{1.3}Al_{0.3}Ti_{1.7}(PO_4)_3$, $Li_{1+x}Al_xM_{2-x}(PO_4)_3$ (where M=Ge, Ti, and/or Hf, and where $0<x<1$), $Li_{1+x+y}Al_xTi_{2-x}Si_yP_{3-y}O_{12}$ (where $0\leq x\leq 1$ and $0\leq y\leq 1$), $Li_{1+x+z}M_x(Ge_{1-y}Ti_y)_{2-x}Si_zP_{3-z}O_{12}$ (where $0\leq x\leq 50.8$; $0\leq y\leq 1.0$; $0\leq z\leq 0.6$), and particularly formulations 4.9LiI-34.1$Li_2O$-61$B_2O_3$, 0.30$Li_2S$-0.26$B_2S_3$-0.44LiI, 60$Li_2S$-40$SiS_2$, 0.02$Li_3PO_4$-0.98($Li_2S$—$SiS_2$), 2($Li_{1.4}Ti_2Si_{0.4}P_{2.6}O_{12}$)—$AlPO_4$, 0.7$Li_2S$-0.3$P_2S_5$.

In another embodiment, the electrolyte particles are composed of at least one polymer impregnated with a lithium salt, the polymer preferably being chosen from the group formed by polyethylene oxide, polyimides, polyvinylidene fluoride, polyacrylonitrile, polymethyl methacrylate, polysiloxanes, and the lithium salt preferably being chosen from among LiCl, LiBr, LiI, $Li(ClO_4)$, $Li(BF_4)$, $Li(PF_6)$, $Li(AsF_6)$, $Li(CH_3CO_2)$, $Li(CF_3SO_3)$, $Li(CF_3SO_2)_2N$, $Li(CF_3SO_2)_3$, $Li(CF_3CO_2)$, $Li(B(C_6H_5)_4)$, Li(SCN), $Li(NO_3)$.

In yet another embodiment, the particles of electrolyte material are composed of a mix of inorganic particles and organic particles.

In another embodiment, the so-called consolidation step is a mechanical compaction step by the application of a pressure between 20 MPa and 100 MPa, preferably between 40 and 60 MPa.

In one embodiment, the so-called consolidation step is a thermal consolidation step at a temperature $T_R$ that preferably does not exceed 0.7 times the melting temperature (expressed in ° C.), even more preferably does not exceed 0.5 times the melting temperature (expressed in ° C.), and much more preferably does not exceed 0.3 times the melting temperature (expressed in ° C.) of the electrolyte material that melts at the lowest temperature, so that conducting substrates with low melting points can be used.

The term "melting temperature" in this case includes the decomposition temperature for the case of substances for which there is no melting point.

In another embodiment, the consolidation step comprises a step to apply a pressure of between 20 et 100 MPa, followed by a heat treatment step at a temperature $T_R$ that preferably does not exceed 0.7 times the melting temperature (expressed in ° C.), even more preferably does not exceed 0.5 times the melting temperature (expressed in ° C.), and much more preferably does not exceed 0.3 times the melting temperature (expressed in ° C.) of the electrolyte material that melts at the lowest temperature.

In another embodiment, the consolidation step comprises annealing at a temperature $T_R$ that preferably does not exceed 0.7 times the melting temperature (expressed in ° C.), even more preferably does not exceed 0.5 times the melting temperature (expressed in ° C.), and much more preferably does not exceed 0.3 times the melting temperature (expressed in ° C.) of the electrolyte material that melts at the lowest temperature, followed by application of a pressure of between 20 and 100 MPa and preferably between 40 and 60 MPa.

In yet another embodiment, the so-called consolidation step is a heat treatment step under pressure at a temperature $T_R$ that preferably does not exceed 0.7 times the melting temperature (expressed in ° C.), even more preferably does not exceed 0.5 times the melting temperature (expressed in ° C.), and much more preferably does not exceed 0.3 times the melting temperature (expressed in ° C.) of the electrolyte material that melts at the lowest temperature, at a pressure preferably between 20 and 100 MPa.

The combination of an applied pressure and a heat treatment makes it possible to perform the heat treatment at lower temperatures than if it were done alone, and/or the mechanical compaction can be made at lower pressures than if it were done alone.

Advantageously, the consolidation step d) is done under a vacuum or under an inert atmosphere (for example under argon) to prevent oxidation of the metallic substrate.

In one embodiment, the zeta potential of the suspension of electrolyte material particles is more than 40 mV, and preferably more than 60 mV. Such suspensions are very stable and include few particle clusters, so that deposits contain few defects.

The suspension of particles of electrolyte material may also contain a steric or preferably electrostatic stabilizer. In some cases, this stabilizer can improve the stability of the suspension, and consequently the quality of the deposited film.

However, stable suspensions of particles of electrolyte material that do not contain a stabilizer are preferred. These suspensions are obtained for dry extracts of between 2 and 20 g/L, preferably between 3 and 10 g/L, and more particularly of the order of 4 g/L. In these suspensions, the particle size is also preferably smaller than 100 nm and even more preferably smaller than 50 nm. In this case, the Zeta potential of the suspension is usually less than 40 mV, and more particularly is between 25 and 40 mV.

In some embodiments, the thickness of the deposited electrolyte thin film is less than 10 μm, preferably less than 5 μm, and even more preferably less than 2 μm.

In another embodiment, the electrolyte film deposited in step b) also covers the edges of said previously formed anode or cathode film. This can improve the resistance to short circuits during self discharge of the battery containing the electrolyte film thus deposited.

Another purpose of the invention is to fabricate all-solid-state Li-ion batteries comprising the solid electrolyte film obtained using the above process.

This purpose is achieved by using a process for fabrication of an all-solid-state battery using this process and comprising the following steps:
 a) Providing a colloidal suspension of particles conducting lithium ions, called a "solid electrolyte materials" suspension;
 b) Providing two flat conducting substrates, preferably metallic, said conducting substrates possibly being used as battery current collectors and possibly at least part of at least one of their faces being coated with a cathode or anode film,
 c) Depositing a thin electrolyte film by electrophoresis, from a suspension of electrolyte material particles, on said anode film and/or said cathode film and/or said substrate obtained in step b),
 d) Drying the film thus obtained,
 e) Assembling either:
  the substrate/cathode/electrolyte stack obtained in step c) and either the substrate/anode stack obtained in step a) or the substrate/anode/electrolyte stack obtained in step c) to obtain a battery with a stacked "collector/anode/electrolyte/cathode/collector" structure, the substrate/anode/electrolyte stack obtained in step c) and either the substrate/cathode stack obtained in step a) or the substrate/cathode/electrolyte stack obtained in step c) to obtain a battery with a stacked "collector/anode/electrolyte/cathode/collector" structure.

f) Consolidating the electrolyte thin film obtained in the previous step by mechanical compression and/or heat treatment.

DESCRIPTION OF THE FIGURES

FIGS. 1(a), (b), (c) and (d) diagrammatically show films formed by stacking approximately isotropic shaped particles. FIG. 1(e) shows a film deposited on a substrate using the PVD technique.

FIG. 1(a) diagrammatically shows a compact deposition of particles 2 on a substrate 1. All particles 2 are in contact with their adjacent particles 2a, 2b, 2c, 2d. Pores 3 are located between particles 2. The stack shown in this figure (and in FIGS. 1(b), 1(c) and 1(d)) is deliberately less dense than the compact hexagonal stack, so that pores 3 between particles 2 are more easily visible.

FIG. 1(b) diagrammatically shows a compact deposition of particles 2 as can be obtained using the process according to the invention.

FIG. 1(c) shows a deposit of particles 2 on a substrate, the deposit having defects. These defects are essentially cavities 6 related to the presence of clusters 5; therefore these cavities 6 form inter-cluster pores, unlike the intra-cluster pores 3 that are at a much smaller geometric scale. In the case of a deposition using the process according to the invention, these clusters 5 are formed when the suspension used is not sufficiently stable.

FIG. 1(d) shows a deposit of particles with cracks that appeared after drying; these cracks may be open (surface breaking) cracks 7 or internal (non-surface breaking) cracks 8.

FIG. 1(e) shows a dense deposit 4 as can be obtained using PVD type techniques; the porosity of these dense deposits is close to 0% because they are not formed by stacking particles.

FIG. 2 diagrammatically shows a stack or winding 10 of battery electrodes between which a separator 11 is placed in batteries according to the state of the art. More precisely, each cathode 12 and each anode 14 is connected to its cathode collector 13 and anode collector 15 respectively, and each cathode 12 is separated from its anode 14 by a separator 11 that performs the lithium ion transport function through its pores impregnated with electrolyte and the electrical insulation function between the electrodes. If the separator 11 is badly positioned between the electrodes 12 and 14 (for example following a positioning fault, vibration, shock during fabrication), then a short circuit (or a leakage current) can appear between the electrodes 12, 14 in the defect 16 on the edge of the electrodes.

Figure 9:
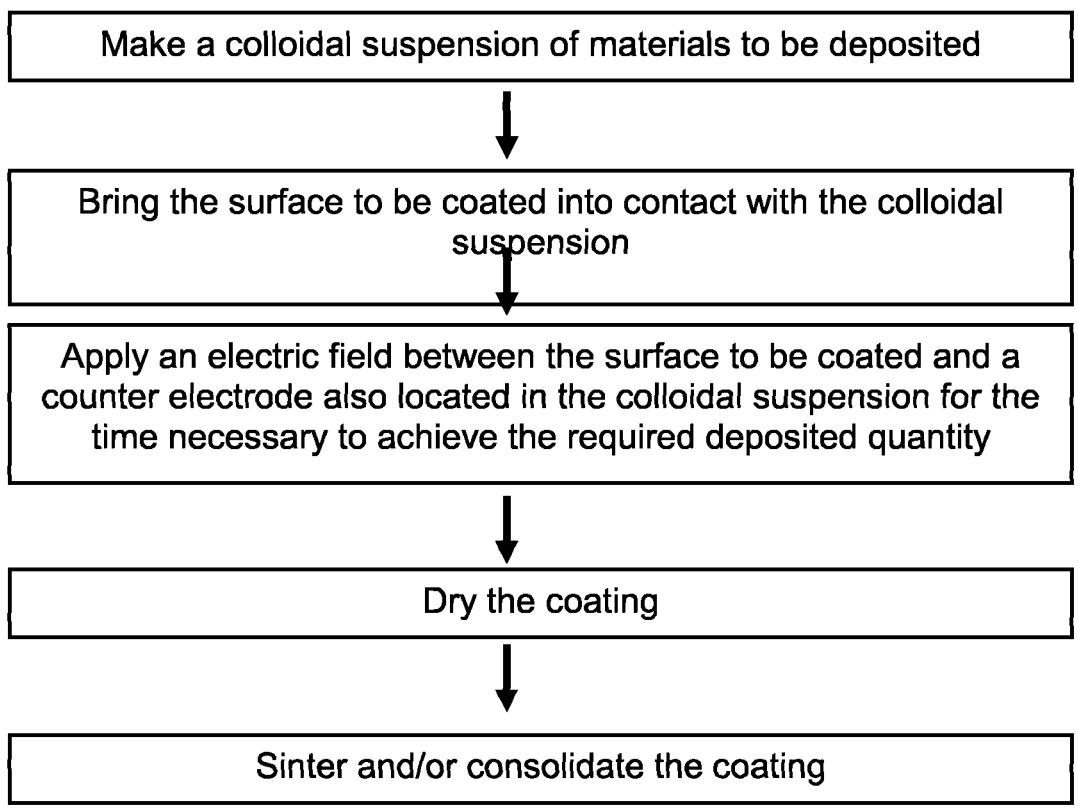
Figure 13:
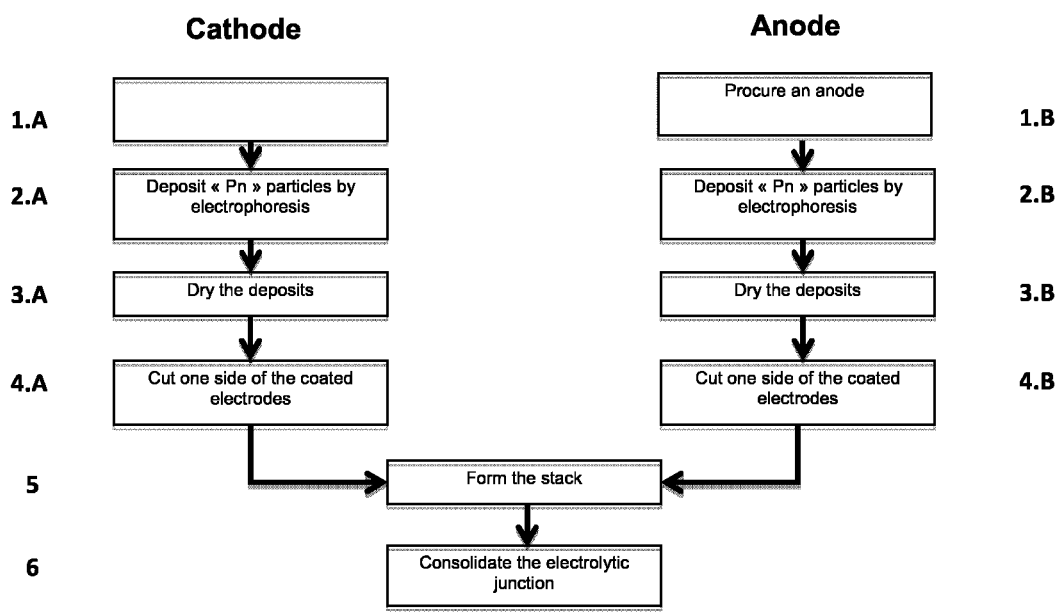

The diagrams in FIGS. 9 and 13 show typical embodiments of the process according to the invention.

Figure 10A:
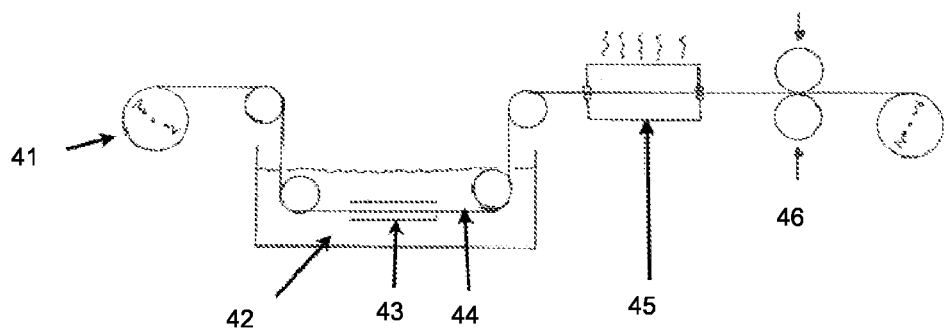
Figure 10B:
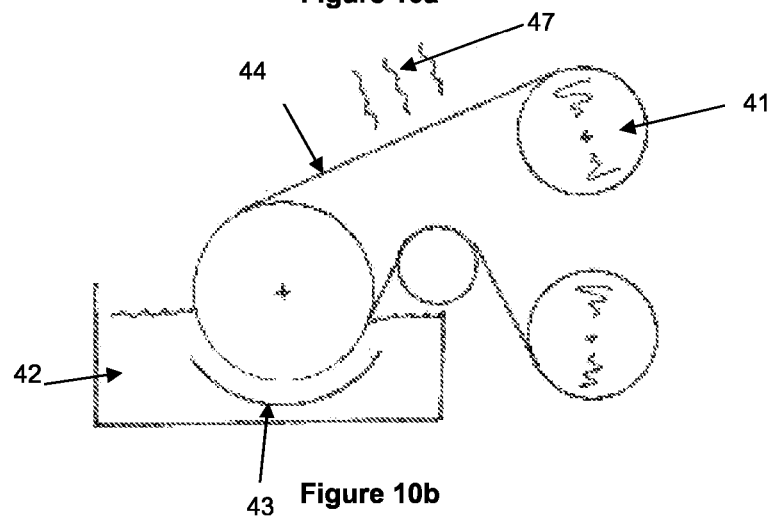

FIGS. 10a and 10b diagrammatically show devices for implementation of the process according to the invention.

Figure 11:
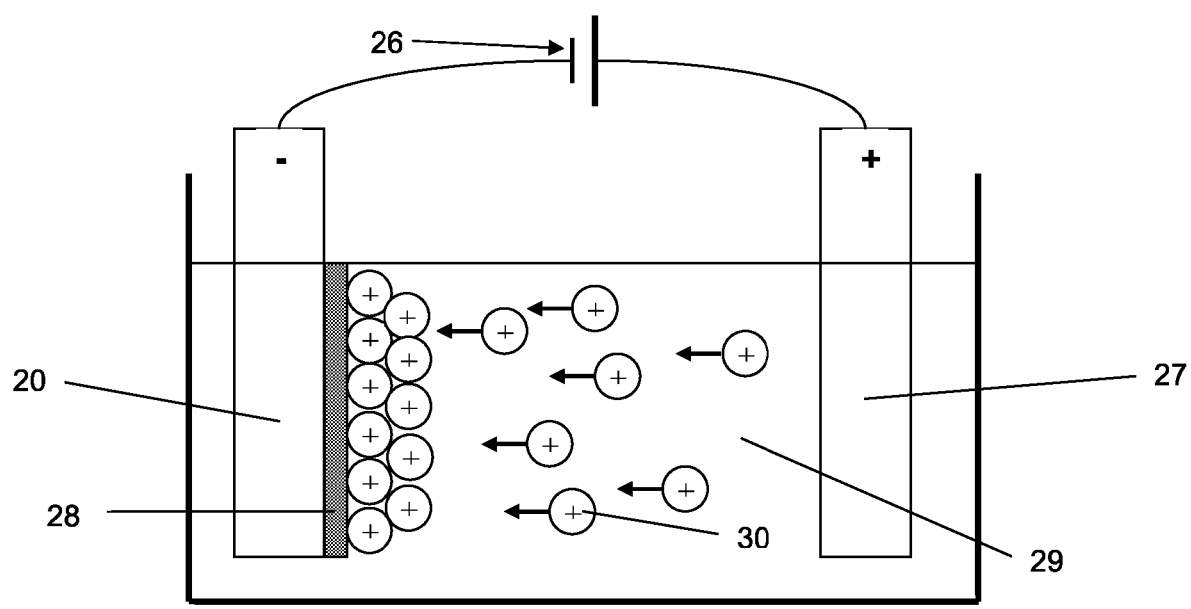

FIG. 11 shows the principle for making a deposition by electrophoresis

Figure 12:
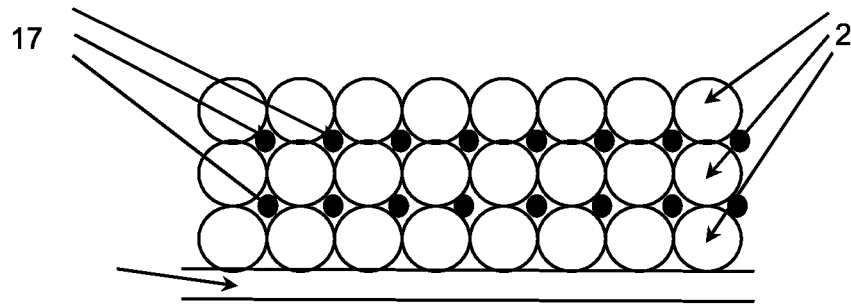

FIG. 12 is a diagrammatic representation of a deposition of two different sizes of nanoparticles.

Figure 14B:
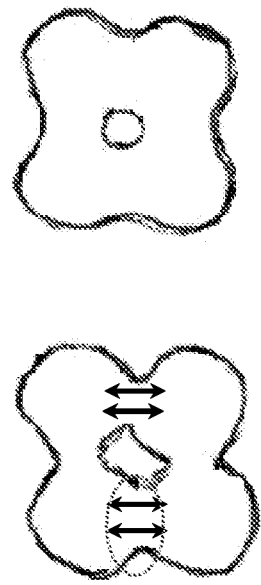
Figure 14D:
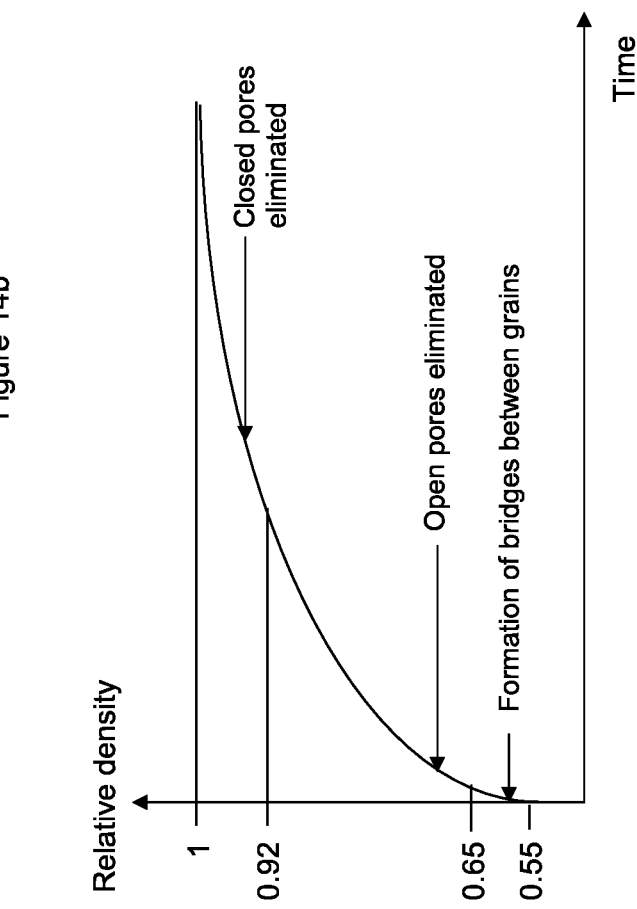
Figure 14A:
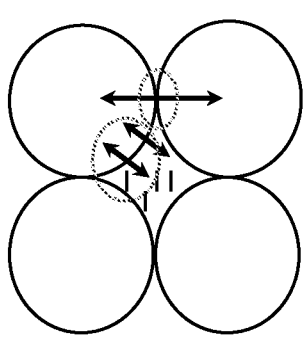
Figure 14C:
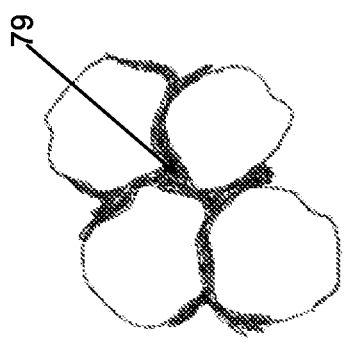

FIGS. 14a, 14b, 14c show lithium diffusion paths in different particle assembly configurations. FIG. 14d shows the variation of porosity as a function of the density of the deposit.

Figure 15:
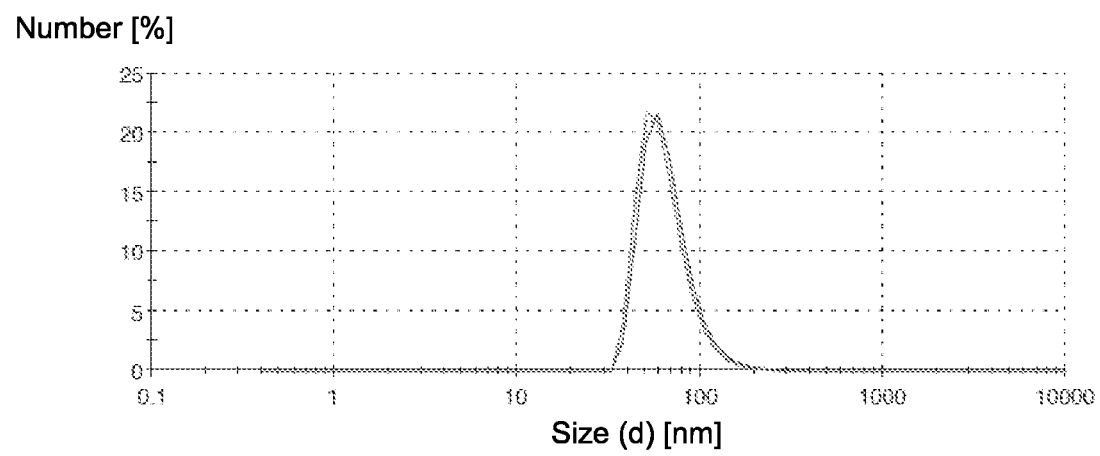

FIG. 15 shows a DLS diagram showing the size distribution of electrolyte nanoparticles in a suspension used for electrophoretic deposition of an electrolyte film.

LIST OF REFERENCES

| | |
|---|---|
| 1 | Substrate |
| 2, 2a, 2b, 2c, 2d | Particles |
| 3 | Pore |
| 4 | Film obtained by PVD deposition |
| 5 | Cluster |
| 6 | Cavity |
| 7 | Surface-breaking crack |
| 8 | Non-surface-breaking crack |
| 10 | Battery according to the state of the art |
| 11 | Separator |
| 12 | Cathode |
| 13 | Cathode collector |
| 14 | Anode |
| 15 | Anode collector |
| 16 | Defect |
| 17 | Particles smaller than particles 2 |
| 20 | Substrate |
| 21 | Anode |
| 22, 22a, 22b | Electrolyte |
| 23, 23a, 23b | Cut edge |

| | |
|---|---|
| 24 | Cathode |
| 25 | Connection between two electrolyte films |
| 26 | Electrical power supply |
| 27 | Counter electrodes for electrophoretic deposition |
| 28 | Deposit |
| 29 | Colloidal suspension |
| 30 | Particles |
| 35, 36 | Electrical contacts |
| 41 | Unwinder |
| 42 | Colloidal suspension |
| 43 | Counter electrode |
| 44 | Metallic substrate |
| 45 | Drying oven |
| 46 | Mechanical consolidation device |
| 47 | Drying the substrate coated with the film deposited by electrophoresis |
| 50 | Substrate edge |
| 63 | Cathode film |
| 65 | Insulating substrate |
| 66 | Electrolyte film |
| 67 | Anode film |
| 68a, 68b | Metal films on insulating substrate 65 |
| 76 | Surface contact zone between particles and the electrolyte contained in pores (low resistance diffusion path) |
| 77 | Point contact zone between particles (diffusion of lithium being limited on this point contact) |
| 78 | Welding of particles during consolidation that led to the development of diffusion paths in the solid, for transport of electrical charges (electrons and ions) |
| 79 | Meltable phase that consolidated the particles to each other |

DESCRIPTION OF THE INVENTION

For the purposes of this invention, "electrophoretic deposition" or "deposition by electrophoresis" refers to a film deposited by a process for deposition of particles with electrically charged surfaces previously put into suspension in a liquid medium on a substrate, displacement of particles towards the surface of the substrate being generated by application of an electric field between two electrodes placed in the suspension, one of the electrodes forming the conducting substrate on which the deposit is made, the other electrode (counter electrode) being located in the liquid phase. A compact deposit of particles thus forms on the substrate if the zeta potential has an appropriate value as will be explained below.

In the context of this document, the particle size refers to its largest dimension. Thus, a "nanoparticle" is a particle for which at least one of its dimensions is smaller than 100 nm. The "particle size" or "average particle size" of a powder or a set of particles is given by $D_{50}$.

The "zeta potential" of a suspension is defined as being the difference in potential between the heart of the solution and the shear plane of a particle of the suspension. It is representative of the stability of a suspension. The shear plane (or hydrodynamic radius) corresponds to an imaginary sphere around the particle in which the solvent moves with the particle when the particles move in the solution.

The theoretical basis and the determination of the zeta potential are known to the electrochemist who develops depositions by electrophoresis; it can be deduced from the electrophoretic mobility. There are several marketed techniques and devices for making a direct measurement of the zeta potential. When the dry extract is small, the zeta potential can be measured using a Zetasizer Nano ZS type equipment made by the Malvern Company. This equipment uses optical devices to measure particle displacement speeds as a function of the electric field applied to them. The solution also has to be highly diluted to enable the passage of light. When the quantity of dry extract is large, the zeta potential can be measured using acoustophoresis techniques, for example using a device called "acoustosizer" made by the Colloidal Dynamics Company. The particle speed is then measured by acoustic techniques.

"Dispersant" refers to a compound capable of stabilizing the colloidal suspension and particularly preventing particles from agglomerating.

"Sintering" means a process that changes a system composed of individual particles (or a porous agglomerate) by heat treatment without any applied external pressure or under the effect of such a pressure, such that at least some of the system properties (if not all of them) are modified, resulting in reducing the global free energy of the system. At the same time, this change leads to a large (if not complete) reduction of the initial porosity. Finally, the process assumes that there is at least one solid phase at all times throughout the heat treatment, so as to maintain some stability of the shape and dimension of the system considered.

The process according to the invention comprises the essential step of electrophoretic deposition of particles of solid electrolyte materials. Such a process can significantly reduce the quantity of defects in films obtained in comparison with quantities obtained with known processes, particularly large pores, cavities, crazing and clusters; the quality of deposited films is better when the suspension from which the deposition is made is sufficiently stable.

The process according to the invention can be used for the deposition of electrolyte thin films. A "thin film" is a film that is usually less than about 10 µm thick, preferably less than about 5 µm, and even more preferably less than about 2 µm thick.

The process for deposition of solid electrolyte thin films according to this invention is an advantageous alternative to known techniques and particularly PVD deposition techniques, in that it can be used to make very dense deposits at low temperature on large substrate areas with high deposition rates, easily and very precisely controllable thicknesses (depending on the particle size) over a wide thickness range varying from a tenth of a micron to several tens or even hundreds of microns without requiring very expensive investments in complex and not very productive machines.

The diagram in FIG. 9 shows a typical embodiment of the process according to the invention:

Step 1: Preparation of suspensions. The powders used have the chemical composition of the coating (thin film) that is to be deposited.

Step 2: Immerse a substrate, previously covered with a film of electrode (anode or cathode) material in the colloidal suspension. The colloidal suspension can cover the entire surface of the substrate. In one particular embodiment, a stencil can be applied to the surface of the substrate so as to limit the area in contact with the suspension, consequently reducing the area of the deposit.

In one particular embodiment, the electrolyte film is deposited on a conducting substrate directly. The anode (lithium) is formed the first time that the battery is charged.

Step 3: Application of an electric field between the substrate and a counter electrode located in the colloidal suspension. This electric field can be constant and/or variable (alternating). The direction of the electric field, in other words the potential applied to the electrodes, is adapted to the charge of the particle to be deposited (cataphoresis or anaphoresis).

Step 4: Drying. Drying conditions depend on the deposited thickness and the nature of the solvent.

A mechanical consolidation step can be made on the wet film before drying, for example by calendering or static compression; this can improve the quality of the film, but does not replace dry consolidation.

Step 5: Consolidation. Consolidation is done by mechanical consolidation and/or heat treatment.

We will describe each step in the process according to the invention in detail below.

Preparation of Suspensions

Deposition is preferably done from very stable colloidal suspensions so as to obtain a deposit with a perfectly uniform thickness with no roughness, few defects and as compact as possible after the electrophoretic deposition process. This minimizes the formation of pores, cavities and clusters that hinder consolidation of the deposit. The stability of suspensions depends on the size of the particles and the nature of the solvent used and possibly the stabilizer that was used to stabilize the colloidal suspension.

The stability of suspensions can be expressed by their zeta potential. In the context of this invention, the suspension is considered to be stable when its zeta potential is more than 40 mV, and very stable when it is more than 60 mV. On the other hand, particle clusters can develop when the zeta potential is less than 20 mV. Thus, in some embodiments, depositions are made from colloidal suspensions with a zeta potential of more than 40 mV, and even more preferably 60 mV (absolute value) to guarantee good compaction of the thin film. However, in other preferred embodiments of this invention, the suspensions have small quantities of dry extracts of particles and the zeta potential is less than 40 mV, as is described in more detail below.

Colloidal suspensions must contain nanometric-sized particles to facilitate subsequent thermal consolidation of the deposit and to guarantee that thin film deposits can be made with very precise thicknesses and profiles (roughness). If several materials are present in said colloidal suspension, it is preferred that they are all present in the form of nanoparticles. These particles preferably have an average particle size $D_{50}$ less than 100 nm, and even more preferably less than 30 nm. Thermal consolidation of the deposit with small particles is much facilitated if the deposit is compact.

Mechanical consolidation may be more difficult, but the inventors have found that combining a mechanical consolidation and a thermal consolidation provides a solution to the problem.

Colloidal suspensions that will be used in electrophoresis comprise an electric insulating solvent that may be an organic solvent, or demineralized water, or a mix of solvents, and particles to be deposited; colloidal suspensions may also comprise one or several stabilizers. In a stable suspension, the particles do not agglomerate with each other to create clusters that could induce cavities, clusters and/or important defects in the deposit. Particles remain isolated in the suspension.

Also in one embodiment of this invention, the stability of the suspension necessary to obtain a compact deposit is obtained through the addition of stabilizers. The stabilizer avoids flocculation of powders and the formation of clusters. It can act electrostatically or sterically. Electrostatic stabilization is based on electrostatic interactions between charges and is obtained by the distribution of charged species on particle surfaces. Electrostatic stabilization is controlled by the nature of surface charges; consequently, it may depend on the pH. Steric stabilization uses non-ionic surfactant polymers or even proteins which, when added to the suspension, are adsorbed on particles surfaces to cause repulsion by congestion of the inter-particle space. A combination of the two stabilization mechanisms is also possible. Electrostatic stabilization is preferred for the purposes of this invention because it is easy to implement, reversible, inexpensive and facilitates subsequent consolidation processes.

However, the inventors have observed that with nanoparticles of electrolyte materials used for this invention, stable colloidal suspensions can be obtained containing particles that do not agglomerate among themselves and/or of clusters of a few particles, without any addition of stabilizers. Particles and/or clusters are preferably smaller than 100 nm, and even more preferably smaller than 50 nm.

These suspensions were obtained for low quantities of dry extracts between 2 g/L and 20 g/L, preferably between 3 and 10 g/L, and more particularly for dry extracts of the order of 4 g/l, in an alcohol and/or ketone type organic solvent. These stable colloidal suspensions of particles without added stabilizers are especially preferred for this invention.

The Zeta potential of such suspensions is usually less than 40 mV, and more particularly between 25 and 40 mV. This could mean that such suspensions tend to be unstable, however the inventors have observed that the use of these suspensions for an electrophoretic deposition leads to very good quality deposited films.

In these suspensions, the nanoparticles are usually negatively charged, therefore they are compatible with anaphoretic depositions.

The addition of stabilizers or cations in such suspensions to modify the surface charge of nanoparticles to make them compatible with cataphoretic polarizations would result in polluting the deposits; even worse, only slightly volatile organic stabilizers could result in nanoparticles being electrically isolated thus preventing any electrochemical response.

Deposition voltages of less than 5 V must be preferred when the solvent used is water, because above 5 V, water can be electrolyzed causing gas production on electrodes making deposits porous and reducing their bond onto the substrate. Galvanic reactions in an aqueous medium also cause the formation of metal cations that can pollute deposits.

In one preferred embodiment, depositions are made in a solvented phase. It is thus possible to work at much higher voltages, thus increasing deposition rates.

Since the thin electrolyte film in a Li-ion battery must be a good ion conductor and an electrical insulator, the nanoparticles used are advantageously but non-limitatively chosen from among one or several of the following materials (all compositions being molar): LiPON (compound of lithium phosphorus oxinitride: $Li_{2.9}PO_{3.3}N_{0.46}$), LiSiPON (compound of lithium phosphorus and silicon oxinitride: $Li_{1.9}Si_{0.28}P_{1.0}O_{1.1}N_{1.0}$), or formulations based on $Li_4SiO_4$, $Li_3PO_4$, $Li_2CO_3$, $B_2O_3$, $Li_2O$, $Al(PO_3)_3LiF$, $P_2S_3$, $Li_2S$, $Li_3N$, $Li_{14}Zn(GeO_4)_4$, $4.9LiI$-$34.1Li_2O$-$61B_2O_3$, $Li_{3.6}Ge_{0.6}V_{0.4}O_4$, $0.30Li_2S$-$0.26B_2S_3$-$0.44LiI$, $LiTi_2(PO_4)_3$, $60Li_2S$-$40SiS_2$, $Li_{1.3}Al_{0.3}Ti_{1.7}(PO_4)_3$, $0.02Li_3PO_4$-$0.98(Li_2S$—$SiS_2)$, $Li_{0.35}La_{0.55}TiO_3$, $2(Li_{1.4}Ti_2Si_{0.4}P_{2.6}O_{12})$—$AlPO_4$, $Li_{3.25}Ge_{0.25}P_{0.25}S_4$, $0.7Li_2S$-$0.3P_2S_5$, $Li_{1+x}Al_xM_{2-x}(PO_4)_3$, where M=Ge, Ti, Hf and $0<x<1$, $Li_{1+x+y}Al_xTi_{2-x}Si_yP_{3-y}O_{12}$, $Li_{1+x+z}M_x(Ge_{1-y}Ti_y)_{2-x}Si_zP_{3-z}O_{12}$, ($0=<x=<0.8$; $0=<y=<1.0$; $0=<z=<0.6$), LiBON, LiBSO, LiSiPON, LiSON, thio-LiSiCON, $La_{0.5}Li_{0.34}TiO_{2.94}$, $Li_{3.4}V_{0.4}Ge_{0.6}O_4$, $Li_2O$—$Nb_2O_5$, LiPONB, $LiAlGaSPO_4$, polymers belonging particularly to the following families: polyimide, PVDF, PEO (polyethylene oxide), polymethacrylate, polysiloxane, impregnated with a lithium salt. These lithium salts may be LiCl, LiBr, LiI, $Li(ClO_4)$, $Li(BF_4)$, $Li(PF_6)$, $Li(AsF_6)$, $Li(CH_3CO_2)$, $Li(CF_3SO_3)$, $Li(CF_3SO_2)_2N$, $Li(CF_3SO_2)_3$, $Li(CF_3CO_2)$, $Li(B(C_6H_5)_4)$, Li(SCN), $Li(NO_3)$.

Deposition of the Electrolyte Film

According to the invention, the dense thin electrolyte film is deposited by electrophoresis. The electrophoretic deposition of particles is made by application of an electric field between the substrate on which the deposit is made and a counter electrode, in order to move the charged particles in the colloidal suspension and to deposit them on the substrate. The lack of binders and other solvents deposited on the surface with the particles can result in very compact deposits. The compactness obtained due to electrophoretic deposition and the lack of any large quantities of organic compounds in the deposit can limit or even prevent risks of crazing or the appearance of other defects in the deposit during drying steps. A mechanical compaction can be done for example by pressing, before drying, to improve the film quality; this does not replace mechanical consolidation after drying, that has a different effect.

Furthermore, due to the fact that the deposit obtained by electrophoresis does not contain any binders or other organic compounds, the process according to this invention does not require any burning or evaporation steps of corrosive or noxious compounds. The increase in economic and environmental constraints makes it necessary to reduce releases into the atmosphere and this invention thus satisfies these constraints.

Furthermore, the deposition rate can be very high depending on the applied electric field and the electrophoretic mobility of particles in suspension. For an applied voltage of 200 V, the deposition rate can be as high as about 10 µm/min.

The inventor has observed that this technique can be used to make deposits on very large areas with excellent uniformity (provided that the particle concentrations and electric fields are uniform over the surface of the substrate). It is also suitable for a continuous band process, or for a batch process on plates.

The solid electrolyte film is deposited on an anode and/or cathode film, themselves formed on a conducting substrate using an appropriate process, and/or directly on a metallic substrate. When the electrolyte film is deposited directly on the conducting substrate, the anode is then formed by electrodeposition of lithium between the substrate and the electrolyte film during the first battery charge. For example, a copper or aluminium foil, for example 6 µm thick, or a polymer band with an electrically conducting surface deposit, can be used for the conducting substrate. Anode and cathode films can be deposited by electrophoresis, or by inking or by vacuum deposition.

Deposition by electrophoresis may be applied in a "batch" (static) type process or in a continuous process. FIGS. 10a and 10b show different embodiments of electrophoretic depositions to make deposits on one face or two faces of a substrate.

During the electrophoretic deposition, a stabilized power supply can be used to apply a voltage between the conducting substrate and two electrodes located on each side of this substrate. This voltage may be direct or alternating. Precise monitoring of the currents obtained helps to monitor the deposited thicknesses and to control them precisely. When the deposited films are insulating, their thickness affects the value of the electric field and in this case, a controlled current deposition mode is preferred. The value of the electric field is modified depending on the resistivity of the interface.

FIG. 10a diagrammatically shows an installation to make use of the process according to the invention. The electrical power supply located between the counter electrodes 43 and the conducting substrate 44 is not shown. An electric field is applied between the two counter electrodes 43 and the substrate 44 to deposit particles of the colloidal suspension 42 on the two faces of the substrate 44.

The reel of electricity conducting foil (band) 44 acting as the substrate is unwound from an unwinder 41. After deposition, the deposited film is dried in a drying oven 45 and is then consolidated by mechanical compaction using an appropriate compaction means 46. Consolidation can be done under a controlled atmosphere at temperatures between ambient temperature and the melting temperature of deposited materials.

The view in FIG. 10a is interesting for the fabrication of solid electrolyte deposits on the two faces of a substrate previously coated with an electrode material. However, it can be sufficient to coat a single face of the substrate previously coated with an electrode material. FIG. 10b shows a device to make a coating on a single conducting face without mechanical consolidation.

Electrophoretic deposition of an electrolyte film gives perfect coverage of the electrode film surface regardless of its geometry and the presence of roughness defects. Consequently, it can guarantee dielectric properties of the deposit.

The lack of mechanical contacts means that deposits can be made on extremely large areas. With known ink deposition techniques, it is difficult to guarantee a perfectly uniform thickness over large substrates, which is why the width of coating lines is often limited. For example, when it is required to deposit Li-ion battery electrodes with the precision necessary to guarantee electrical balancing of the electrodes, the maximum band width is about 200 to 300 mm, which strongly limits the production capacity of coating lines according to the state of the art.

When materials that do not conduct electricity or conduct electricity only slightly are deposited on the surface of a substrate, any zones that are not so well coated conduct better and thus locally concentrate a higher deposition rate that tends to compensate or even eliminate the defect. The deposits obtained are thus intrinsically deposited over the entire surface. The thickness of the electrophoretically deposited film can vary between a few tens of µm and 0.1 µm, but thicker or thinner films are possible. However, it is preferable if the thickness of the electrophoretic deposit of the electrolyte is less than 5 µm, and even more preferably less than 2 µm so as to not induce too high resistances in the battery while guaranteeing good mechanical integrity of the cell.

Consolidation of the Deposit

The process according to the invention requires consolidation of the electrolyte thin film deposited by electrophoresis and dried. The stack of particles obtained after electrophoretic deposition and drying is fragile, particularly because it is porous. Its mechanical properties are not sufficient to guarantee integrity of the physical separation between the electrodes.

Consolidation can thus make the density of the deposit similar to or identical to that of a solid material. Thus, this dense film structure is similar to the structure obtained with vacuum deposition techniques, the film is continuous without pores and ions can easily migrate in it, without it being necessary to add liquid electrolytes containing lithium salts, such liquid electrolytes being the cause of poor thermal performances and poor resistance in aging.

The deposit can be consolidated:
a) by a mechanical means, particularly by isostatic pressing.
b) by heat treatment. The temperature depends closely on the chemical composition of deposited powders and also depends on particle sizes and the compactness of the deposit. It is preferable to maintain a controlled atmosphere to prevent oxidation and surface pollution of the deposited particles;
c) by a combination of thermal and mechanical means, and particularly by heat treatment under pressure.

Consolidation to obtain a dense film can be made by a so-called low temperature heat treatment. This temperature is preferably less than $0.7T_f$, more preferably less than $0.5T_f$, and even more preferably less than $0.3\ T_f$, where $T_f$ is the melting temperature of the deposited material that melts at the lowest temperature. The heat treatment temperature depends particularly on the melting temperature of the deposited material, the particle size and the compactness of the particle stack. In general, it is preferred not to exceed 600° C., and even more preferably not to exceed 500° C. In some embodiments, the temperature is between 180° C. and 400° C.

Consolidation at such temperatures requires that the film obtained at the end of the deposition should be compact with no meso-pores nor aggregates. Meso-porosity refers to cavities and cracks. This is possible with the electrophoretic deposition process as described above. It is also necessary that deposited particles have nanometric sizes as described above and preferably smaller than 100 nm, more preferably smaller than 50 nm, and even more preferably smaller than 30 nm.

Furthermore, the heat treatment temperature also depends on whether or not a pressure is applied, pressure being applied possibly before or during the heat treatment. The heat treatment temperature can be lowered when pressure is applied.

When the electrolyte film contains polymer particles or is composed of a polymer impregnated with a lithium salt, the compaction pressure is advantageously of the order of 100 MPa.

In some cases, the only way to achieve consolidation is compression (application of a mechanical pressure). In particular, when the film is composed of a polymer impregnated with a lithium salt, there is no need for a consolidation heat treatment, since the polymer particles are easily deformed even at relatively low pressures.

When the electrolyte film is composed solely of inorganic materials, the applied pressure will have to exceed 250 MPa or even 400 MPa in some embodiments. However, advantageously, the applied pressure is between 30 and 100 MPa, and preferably between 40 and 60 MPa.

Thus, thin film or relatively thick film deposits can be made with porosity of less than 5% or even 2% without needing to apply high temperatures and/or long heat treatment times. Furthermore, consolidation of compact deposits at low temperature considerably reduces risks of shrinkage. Thus, it is no longer necessary to use very complex and expensive heat treatment cycles to consolidate deposits of ceramic particles for battery electrolyte films.

During the mechanical and/or thermal consolidation phase, it can be advantageous to work under a vacuum or under an inert atmosphere to prevent the appearance of pollution on particle surfaces that could be harmful to the consolidation mechanism of particles among each other.

For particle sizes like those used in the process according to the invention, the increase in surface energies becomes the main driving force of consolidation by heat treatment; this results in a large reduction in consolidation temperatures when the particle size reduces. However, if this reduction in consolidation temperatures is to be effective, it is necessary for particles to be firstly mechanically compacted and/or deposited with compact stacking. The multiplication of mechanical contacts between these particles facilitates diffusion processes that cause consolidation. Thus, pressing is usually applied to compact deposits.

The presence of clusters and inter-cluster cavities also has an influence on consolidation. As cavity sizes increase, the diffusion distance also increases and the consolidation temperature necessary to obtain good consolidation increases.

Thus, with nanoparticles deposited by electrophoresis, it is possible to approach the theoretical compactness of a compact stack of spheres (74%), without a mechanical compaction step.

Such a result is not possible using inking techniques. Deposition of nanoparticles using the ink technique mentioned above is very difficult with thin films because the reduction in particle size increases the viscosity of suspensions. Thus, the dry extract has to be reduced by increasing the proportion of solvent; in this case, pores and cavities are induced when much of the solvent is eliminated from the raw films, and it is practically impossible to fill them without the use of extreme temperatures and/or pressures.

The high compactness of the deposit obtained by electrophoresis and the small quantity of solvent to be evaporated very significantly reduce the risk of appearance of cracks after drying. Furthermore, the small size of the particles and their large specific area tend to facilitate consolidation steps by a heat treatment. The deposit can thus be consolidated at temperatures close to approximately $0.7T_f$, and preferably $0.5T_f$ or even $0.3T_f$ where $T_f$ is the melting temperature (expressed in ° C.) of the solid material (with the lowest melting temperature) with chemical composition identical to that of the deposited particle.

Mechanical compression can also be applied to this deposit in order to further reduce this consolidation temperature, in order to further increase its compactness and/or create isolated defects that will contribute to accelerating the consolidation process and obtaining thin films with no pores.

Such a process for the fabrication of thin films can be used directly on substrates such as aluminium foil with low melting temperatures.

Consolidation (heat treatment) at low temperature of the electrolyte film deposited by electrophoresis using the process according to this invention prevents risks of inter diffusion between electrode and electrolyte films, oxidation of electrodes, risks of deterioration (melting or creep) of current collectors and the loss of lithium contents in insertion materials.

FIG. 13 diagrammatically shows steps in the fabrication of a battery comprising an electrolyte film according to the invention using an embodiment of the process according to the invention; the product obtained at each step is shown diagrammatically in FIGS. 3(b) to 3(d) and 4.

An anode 21 and a cathode 24 are provided in steps 1.A and 1.B respectively. The electrolyte film 22 that may be of the order of 1 μm thick is deposited on the anode 21 and the cathode 24 respectively in steps 2.A and 2.B. This deposit also covers three of the four edges of the electrodes, as shown diagrammatically in FIG. 3(b). This isolation of the edges of electrodes prevents the risk of short circuit and the risk of leakage currents. This electrolyte deposit is dried in steps 3.A and 3.B.

Figure 3A:
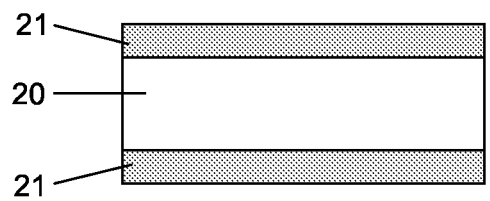
FIGS. 3(a), 3(b), 3(c) and 3(d) and FIG. 4 show products obtained with four steps in a particular embodiment of the process according to the invention.
Figure 3B:
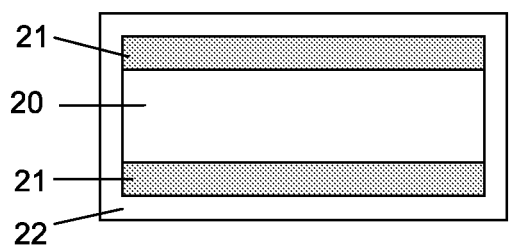
Figure 3C:
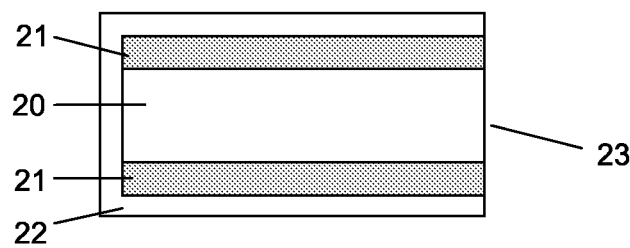
Figure 3D:
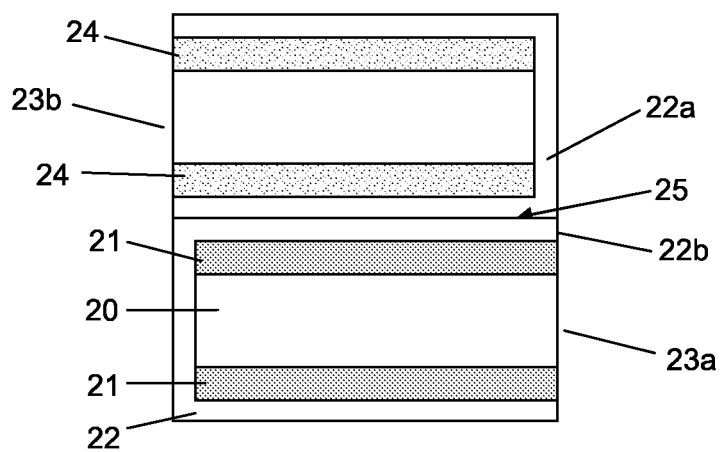

One edge of the electrodes is cut out in steps 4.A and 4.B. Advantageously, the edge related to the band is cut out in order to leave three edges covered with electrolyte on the edge. Since this electrolyte is a dielectric, it means that all that will appear in a later stacking step is anode contacts on one side of the cell and cathode contacts on the other side, so that parallel assemblies of battery elements can be made to form a higher capacity battery cell. FIG. 3(c) diagrammatically shows such a cell section after cutting. FIG. 3(d) shows a section through this coated substrate 20 (in this case it is coated on two faces) of a cathode film 21 cut on one edge 23.

Figure 4:
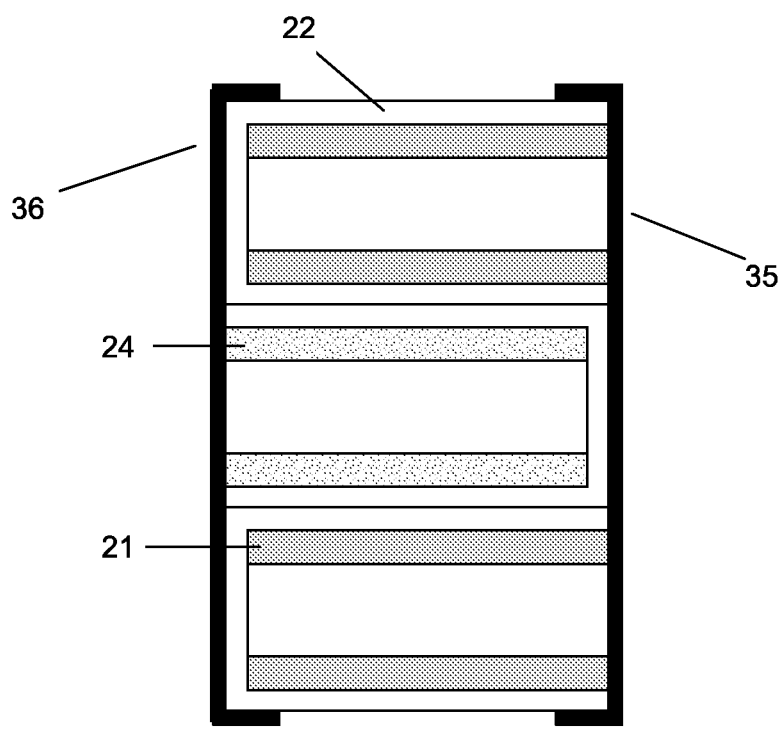

A stack is made in step 5, such that there is a succession of cut edges 23a of the anode 21 and edges of the cathode 24 coated with electrolyte 22 on the two opposite sides of the stack alternately. FIG. 4 shows a stack of two substrates 20, one coated with an anode film 21 on both faces, and the other coated with a cathode film 24, the two faces of the electrolyte film 22a,22b being placed one above the other to form a common interface 25. In step 6, this stack is heat-treated and/or mechanically compacted to obtain a dense electrolyte film. This also provides a good bond ("weld") between the two faces 22a,22b of the electrolyte film 22.

At this stage, it is important to remember that depositions with a very good initial compactness can be obtained using electrophoretic techniques. Thus the shrinkage of such a deposit during consolidation is small and therefore there are few or no defects in the films, even if they are made over large areas and thicknesses. Furthermore, this consolidation step will be done more easily at low temperatures and for short times if the initial film is compact and particles are small. It is advantageous to use small particles (<30 nm) and/or with parallelepiped shapes in order to further increase compactness before heat treatment.

Once the stack is complete, terminations (electrical contacts) 35, 36 are added at the level at which the cathode current and anode current collectors respectively are visible (not coated with insulating electrolyte). These contact zones may be on opposite sides of the stack to collect current as shown in FIG. 4, but they may also be on the same sides or on adjacent sides.

In one particular embodiment, the stack shown in FIG. 4 is made by winding two half-electrodes (one of which is shown in FIG. 3(c)) together on a mandrel to obtain a cylindrical-shaped cell. As for the configuration in FIG. 4, the anode connections then project from one side, while the cathode connections project from the other side.

All the following figures show only two cells in the stacks, but it is obvious that the number of stacked cells can be much higher.

Figure 5A:
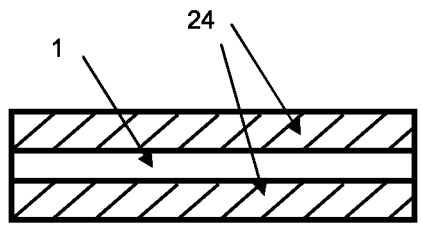
FIGS. 5a, 5b show products obtained in different steps in a particular embodiment of the process according to the invention.
Figure 5B:
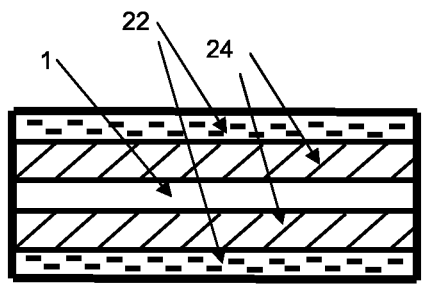

FIGS. 5a and 5b show the different steps in an electrophoretic deposition according to the invention. FIG. 5a shows the procurement of a substrate, in this case in the form of metal foil 1 coated with a cathode film 24. FIG. 5b shows an electrophoretic deposition of electrolyte nanoparticles on the cathode. The product obtained by the process according to FIGS. 5a and 5b corresponds to the case in which the substrate is procured in the form of a band, and substrate plates coated with cathode and electrolyte are then cut out from the band.

Figure 6A:
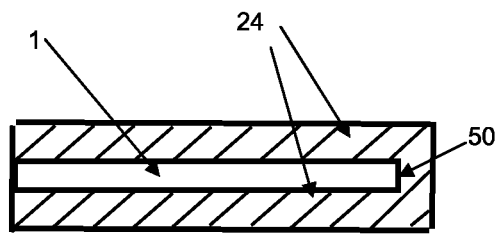
FIGS. 6a, 6b show products obtained in different steps in a particular embodiment of the process according to the invention.
Figure 6B:
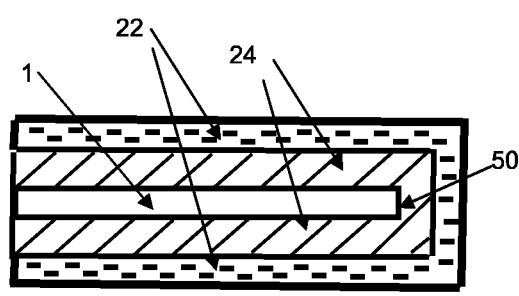

FIGS. 6a and 6b show products identical to those in FIGS. 5a and 5b, except that the cathode film and the electrolyte film also cover one edge 50 of the substrate 1. This product is obtained from a pre-cut substrate plate 1 on which cathode and then electrolyte films are deposited.

Figure 7A:
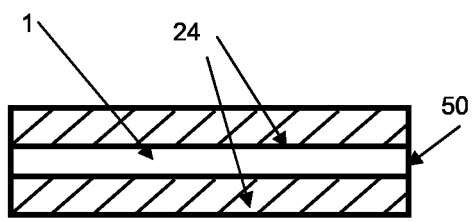
FIGS. 7a, 7b show products obtained in different steps in a particular embodiment of the process according to the invention.
Figure 7B:
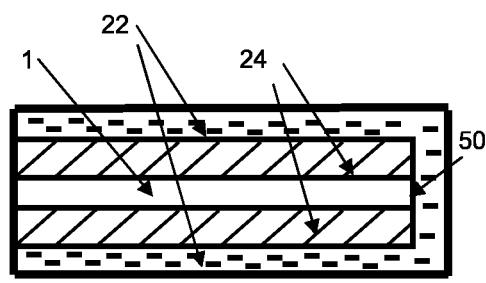

FIGS. 7a and 7b show products identical to those in FIGS. 5a and 5b, except that the electrolyte film also covers one edge 50 of the substrate 1 and the cathode film 24. In this embodiment, the electrophoretic deposition of cathode nanoparticles was made on a band that was subsequently cut, and the electrolyte is deposited after cutting.

Figure 8A:
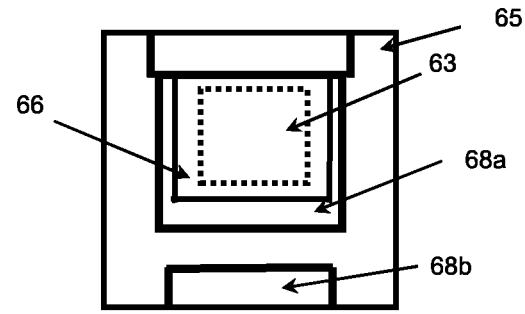
FIGS. 8a, 8b show products obtained in different steps in another particular embodiment of the process according to the invention, in which the substrate on which the electrodes are deposited is a polymer plate comprising metalized zones.
Figure 8B:
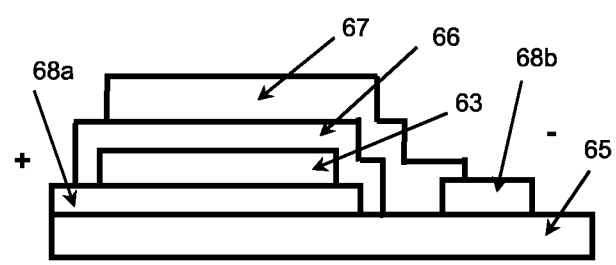

FIG. 8a shows the electrophoretic deposition of electrolyte nanoparticles 66 on the metal part of the substrate 68a coated with the cathode 63. In this embodiment, a substrate is procured in the form of an insulating plate 65 partially coated with metal films 68a, 68b. FIG. 8b shows a sectional view of the battery obtained after deposition of the anode thin film.

FIG. 12 shows the compact deposition of nanoparticles with non-homogeneous sizes 2, 17. Such a stack can be obtained directly by co-deposition of a mix of different sizes of nanoparticles or by successive depositions of different particle sizes.

FIG. 14a shows the lithium diffusion path in a compact stack of particles impregnated with electrolyte according to the state of the art. There is a surface contact zone 76 between the particles and the electrolyte contained in the pores. The diffusion path is only slightly resistive. There is also a point contact zone 77 between particles. Lithium diffusion on this point contact is limited. FIG. 14b shows the change in the interface between particles during consolidation of the electrolyte film according to the process disclosed in this invention. The diffusion path 78 can be achieved in the solid phase without the use of a liquid electrolyte in the pores. FIG. 14c shows the structure obtained after consolidation of a composite deposit containing a "meltable" phase 79. FIG. 14d diagrammatically shows the influence of consolidation on this type of porosity. This point can justify how the porosity of our batteries is less than 30%. At this level, pores are closed and can no longer be impregnated with electrolyte.

The process according to the invention thus has many advantages:

It can be used to make electrolyte thin films less than 10 μm thick conducting lithium ions. The solid electrolyte films obtained using the process according to the invention can cover the edge of the electrodes and prevent risks of short circuit. The process according to the invention does not require the use of vacuum techniques, it is thus easier to use and more economic. Solid electrolyte films obtained using the processing according to the invention have a porosity of less than 10% and preferably less than 5%. The process according to the invention can be used to fabricate composite solid electrolyte films composed of several distinct phases. Solid electrolyte films made with the process according to the invention are made at low temperatures and consequently can be made on substrates sensitive to high temperatures. Risks of inter-diffusion from one film to the next are limited due to the low porosity of films obtained using the process according to the invention. The grain size of the film is usually less than 1 μm.

EXAMPLES

Example 1

Preparation of the Colloidal Suspension of Electrolyte Material

The first step in making the colloidal suspension containing electrolyte particles is to synthesize nanometric powders of $Li_{1.3}Al_{0.3}Ti_{1.7}(PO_4)_3$ using the process described in the "Thin-film lithium-ion battery derived from $Li_{1.3}Al_{0.3}Ti_{1.7}(PO_4)_3$ sintered pellets" publication by Xiao et al, published in Trans. Nonferrous Me. Soc. China 16 (2006), p. 281-285. Stoechiometric quantities of $Li(CH_3-COO).2H_2O$ and $Al(NO_3)_3.9H_2O$ are dissolved in $CH_3OCH_2CH_2OH$, and $PO(OC_4H_9)_4$ is then added to this mix while stirring. After adding the stoechiometric quantity of demineralized water for hydrolysis of alkoxides, the suspension obtained is dried at 140° C. for 4 hours to form an $Li_{1.3}Al_{0.3}Ti_{1.7}(PO_4)_3$ gel. This gel is then calcinated at 900° C. for 2 hours to obtain an agglomerated powder of $Li_{1.3}Al_{0.3}Ti_{1.7}(PO_4)_3$; this powder is then put into suspension in ethanol at a concentration equal to 20 g/l.

The suspension is added into the bowl of a ball grinder previously filled with 0.1 mm diameter ceramic balls. Grinding for 3 hours in the presence of a few millilitres of polyacrylic acid that acts as a complexing agent can obtain a colloidal solution with particles with size $D_{50}$ equal to 15 nm. The zeta potential of the suspension is of the order of 60 mV.

Production of the Electrochemical Cell

The $Li_{1.3}Al_{0.3}Ti_{1.7}(PO_4)_3$ particles obtained in the suspension are subsequently deposited on the cathode coating, by applying a voltage of 100 V between the substrate and a counter electrode both immersed in the colloidal suspension, until a 1 μm thick deposit is obtained.

The cathode coated with the thin film of electrolyte nanoparticles (not sintered) is then stacked with the anode also coated with a thin film of electrolyte nanoparticles (not sintered). The collector+/cathode/electrolyte/anode/collector stack is then compressed at 400 MPa and then consolidated at 300° C. for 30 minutes until a fully compact and inorganic Li-ion battery cell is obtained.

Example 2

$Li_{1.3}Al_{0.3}Ti_{1.7}(PO_4)_3$ powders were synthesized in the same way as in example 1.

The nanometric $Li_{1.3}Al_{0.3}Ti_{1.7}(PO_4)_3$ powders were put into colloidal suspension in ethyl alcohol by grinding-dispersion. No stabilizer was added to the colloidal suspension that had a dry extract of 10 g/l. The suspension thus obtained was perfectly stable.

The size grading distribution of nanoparticles in colloidal suspensions was determined by DLS (Dynamic Light Scattering), also called photon correlation spectroscopy with a commercial Zetasizer apparatus made by Malvern Instruments. The measurement principle is based on Brownian motion of particles in suspension. This measurement technique quantifies the diffusion rate of particles in solution, to deduce their hydrodynamic radius. DLS measurements shown in FIG. 15 illustrate the size distribution of particles in suspension.

The average size of particles in suspension is 60 nm. We worked almost exclusively with floats of suspensions after settlement, to be sure of not drawing off any clusters.

This film of $Li_{1.3}Al_{0.3}Ti_{1.7}(PO_4)_3$ nanoparticles was obtained from this suspension by electrophoresis (anaphoresis) under a field of 10V/cm for 30 seconds.

Example 3—Synthesis of Nanoparticles that can be Used as Anode, Cathode or Electrolyte Materials: $Li_{2.9}PO_{3.3}N_{0.36}Li_{2.9}PO_{3.3}N_{0.46}$(LIPON)

A nanometric $Li_3PO_4$ powder that has not received any high temperature heat treatment is placed in an alumina scoop placed in a tubular furnace. The powder is then heat treated at 650° C. for 2h under an ammonia atmosphere. The powder thus obtained can be used to prepare electrolyte films in Li-ion type batteries.

What is claimed is:

1. A process for fabrication of a battery, the process comprising:
    providing a colloidal suspension of particles conducting lithium ions as a solid electrolyte materials suspension, wherein the particles of solid electrolyte material are composed of at least one inorganic material;
    providing two conducting substrates as battery current collectors, at least one surface of the conducting substrates being at least partially coated with one of a cathode film and an anode film;
    depositing, via electrophoresis, an electrolyte film from the suspension of electrolyte material particles, on at least one of said anode film of a first of said conducting substrates, said cathode film of a second of said conducting substrates, wherein the porosity of the electrolyte film is less than 10%;
    drying the deposited electrolyte film;
    forming, after drying the deposited electrolyte film, a multi-stack structure that includes one of:
        a conducting substrate/cathode/electrolyte stack formed from the coated second conducting substrate having the deposited electrolyte film, and one of a conducting substrate/anode stack formed from the coated first conducting substrate, and a conducting substrate/anode/electrolyte stack formed from the coated first conducting substrate having the deposited electrolyte film; and
        a conducting substrate/anode/electrolyte stack formed from the coated first conducting substrate having the deposited electrolyte film, and one of a conducting substrate/cathode stack formed from the coated second conducting substrate, and a conducting substrate/cathode/electrolyte stack formed from the coated second conducting substrate having the deposited electrolyte film; and
    consolidating the electrolyte film by at least one of mechanical compression and heat treatment.

2. The process of claim 1, wherein the thickness of the deposited electrolyte film is less than 5 μm.

3. The process of claim 1, wherein the average size of particles of solid electrolyte material is less than 1 μm.

4. The process of claim 1, wherein the average size of particles of solid electrolyte material is less than 100 nm.

5. The process of claim 1, wherein the average size of particles of solid electrolyte material is less than or equal to 30 nm.

6. The process of claim 1, wherein the at least one inorganic material; is selected from a group consisting of:
lithium and phosphorus oxynitrides (LiPON);
lithium, phosphorus, and silicon oxynitrides (LiSiPON);
lithium oxynitrides LiBON, LiBSO, LiSiPON, LiSON, thio-LiSiCON, LiPONB (where B, P, and S represent boron, phosphorus, and sulfur respectively);
$La_{0.5}Li_{0.34}Ti_{2.94}$, $Li_{3.4}V_{0.4}Ge_{0.6}O_4$, $Li_2O-Nb_2O_5$, LiAlGaSPO$_4$; and
$Li_4SiO_4$, $Li_3PO_4$, $Li_2CO_3$, $B_2O_3$, $Li_2O$, $Al(PO_3)_3LiF$, $P_2S_3$, $Li_2S$, $Li_3N$, $Li_{14}Zn(GeO_4)_4$, $Li_{3.6}Ge_{0.6}V_{0.4}O_4$, $LiTi_2(PO_4)_3$, $Li_{0.35}La_{0.55}TiO_3$, $Li_{3.25}Ge_{0.25}P_{0.25}S_4$, $Li_{1.3}Al_{0.3}Ti_{1.7}(PO_4)_3$, $Li_{1+x}Al_xM_{2-x}(PO_4)_3$ (where M=Ge, Ti, and/or Hf, and where 0<x<1), $Li_{1+x+y}Al_xTi_{2-x}Si_yP_{3-y}O_{12}$ (where 0≤x≤1 and 0≤y≤1), $Li_{1+x+z}M_x(Ge_{1-y}Ti_y)_{2-x}Si_zP_{3-z}O_{12}$ (where 0≤x≤0.8; 0≤y≤1.0; 0≤z≤0.6).

7. The process of claim 1, wherein the electrolyte particles comprise at least one polymer impregnated with a lithium salt, the polymer being chosen from a group formed by polyethylene oxide, polyimides, polyvinylidene fluoride, polyacrylonitrile, polymethyl methacrylate, polysiloxanes, and the lithium salt being chosen from among LiCl, LiBr, LiI, $Li(ClO_4)$, $Li(BF_4)$, $Li(PF_6)$, $Li(AsF_6)$, $Li(CH_3CO_2)$, $Li(CF_3SO_3)$, $Li(CF_3SO_2)_2N$, $Li(CF_3SO_2)_3$, $Li(CF_3CO_2)$, $Li(B(C_6H_5)_4)$, Li(SCN), and $Li(NO_3)$.

8. The process of claim 1, wherein the heat treatment is conducted at a temperature $T_R$ that does not exceed one of:
0.7 times the melting temperature (expressed in ° C.) of the electrolyte material that melts at the lowest temperature,
0.5 times the melting temperature (expressed in ° C.) of the electrolyte material that melts at the lowest temperature, and
0.3 times the melting temperature (expressed in ° C.) of the electrolyte material that melts at the lowest temperature.

9. The process of claim 1, wherein consolidating the electrolyte film comprises conducting the mechanical compression at a pressure between 20 and 100 MPa.

10. The process of claim 9, wherein consolidating the electrolyte film comprises conducting the heat treatment, after conducting the mechanical compression, at a temperature $T_R$ that does not exceed one of:
0.7 times the melting temperature (expressed in ° C.) of the electrolyte material that melts at the lowest temperature,
0.5 times the melting temperature (expressed in ° C.) of the electrolyte material that melts at the lowest temperature, and
0.3 times the melting temperature (expressed in ° C.) of the electrolyte material that melts at the lowest temperature.

11. The process of claim 1, wherein consolidating the electrolyte film comprises conducting the heat treatment at a temperature $T_R$ that does not exceed one of:
0.7 times the melting temperature (expressed in ° C.) of the electrolyte material that melts at the lowest temperature,
0.5 times the melting temperature (expressed in ° C.) of the electrolyte material that melts at the lowest temperature, and
0.3 times the melting temperature (expressed in ° C.) of the electrolyte material that melts at the lowest temperature.

12. The process of claim 11, wherein consolidating the electrolyte film comprises conducting the mechanical compression, after conducting the heat treatment, at a pressure of between 20 and 100 MPa.

13. The process of claim 1, wherein consolidating the electrolyte film comprises conducting the heat treatment step while also conducting the mechanical compression under a pressure between 20 and 100 MPa, the heat treatment step being conducted at a temperature $T_R$ that does not exceed one of:
0.7 times the melting temperature (expressed in ° C.) of the electrolyte material that melts at the lowest temperature,
0.5 times the melting temperature (expressed in ° C.) of the electrolyte material that melts at the lowest temperature, and
0.3 times the melting temperature (expressed in ° C.) of the electrolyte material that melts at the lowest temperature.

14. The process of claim 1, wherein consolidating the electrolyte film is conducted under a vacuum or under an inert atmosphere.

15. The process of claim 1, wherein the suspension of particles of electrolyte material contains a dry extract between 2 and 20 g/L.

16. The process of claim 1, wherein the suspension of particles of electrolyte material contains a dry extract between 3 and 10 g/L.

17. The process of claim 1, wherein the suspension of particles of electrolyte material does not contain any stabilizer.

18. The process of claim 1, wherein the electrolyte film also covers the edges of said previously formed anode or cathode film.

* * * * *